United States Patent
Schat (10) Patent No.: US 11,204,832 B2
(45) Date of Patent: Dec. 21, 2021

(54) DETECTION OF A COLD BOOT MEMORY ATTACK IN A DATA PROCESSING SYSTEM

(71) Applicant: NXP B.V., Eindhoven (NL)

(72) Inventor: Jan-Peter Schat, Hamburg (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/838,118

(22) Filed: Apr. 2, 2020

(65) Prior Publication Data

US 2021/0311823 A1    Oct. 7, 2021

(51) Int. Cl.
| | |
|---|---|
| *G06F 11/10* | (2006.01) |
| *G11C 29/52* | (2006.01) |
| *G11C 11/16* | (2006.01) |
| *G06F 11/07* | (2006.01) |
| *G06F 11/14* | (2006.01) |
| *G06F 11/30* | (2006.01) |
| *G06F 21/55* | (2013.01) |

(52) U.S. Cl.
CPC ........ *G06F 11/1068* (2013.01); *G06F 11/076* (2013.01); *G06F 11/1048* (2013.01); *G06F 11/1417* (2013.01); *G06F 11/3037* (2013.01); *G06F 21/554* (2013.01); *G06F 2221/034* (2013.01)

(58) Field of Classification Search
CPC .............. G06F 11/3037; G06F 21/554; G06F 2221/034; G06F 11/1068; G06F 11/076; G06F 11/1048; G06F 11/1417
See application file for complete search history.

(56) References Cited

U.S. PATENT DOCUMENTS

| | | | | |
|---|---|---|---|---|
| 2006/0059373 | A1* | 3/2006 | Fayad | G06F 21/72 |
| | | | | 713/192 |
| 2012/0079593 | A1* | 3/2012 | Adams | G06F 21/554 |
| | | | | 726/23 |
| 2016/0239663 | A1 | 8/2016 | Healy et al. | |
| 2017/0286687 | A1* | 10/2017 | Teglia | G06F 21/575 |
| 2021/0124711 | A1* | 4/2021 | Ansari | G06F 11/0736 |

OTHER PUBLICATIONS

Lucian Cojocar et al. "Exploiting Correcting Codes: On the Effectiveness of ECC Memory Against Rowhammer Attacks;"IEEE, pp. 55-71, May 2019 (Year: 2019).*
Anagnostopoulos, N.A. et al.; "Low-Temperature Data Remanence Attacks Against Intrinsic SRAM PUFs;" 21st Euromicro Conference on Digital System Design (DSD); Aug. 29-31, 2018; Prague, Czech Republic.

(Continued)

*Primary Examiner* — Guy J Lamarre
(74) *Attorney, Agent, or Firm* — Daniel D. Hill (57) ABSTRACT

A method is provided for detecting a cold boot attack in a data processing system. The data processing system includes a processor, a memory with ECC, and a monitor circuit. In the method, during a boot process of the data processing system, the monitor circuit counts read and write accesses to the memory and maintains a count of the number of errors in the memory detected by the ECC. The read and write access count and the error count are used to detect suspicious activity that may indicate a cold boot attack on the memory. A data processing system that implements the method is also provided.

17 Claims, 4 Drawing Sheets

(56) References Cited

OTHER PUBLICATIONS

Bellekens, Xavier et. al; "Data Remanence and Digital Forensic Investigation for CUDA Graphics Processing Units;" 2015 IFIP/IEEE International Symposium on Integrated Network Management (IM); May 11-15, 2015; Ottawa, Ontario, Canada; DOI: 10.1109/INM.2015.7140493.

Gruhn, Michael et al.; "On the Practicability of Cold Boot Attacks;" 2013 International Conference on Availability, Reliability and Security; Sep. 2-6, 2013; Regensburg, Germany; DOI: 10.1109/ARES.2013.52.

Guan, Le et al.; "Copker: A Cryptographic Engine Against Cold-Boot Attacks;" IEEE Transactions on Dependable and Secure Computing, vol. 15, No. 5; Sep.-Oct. 2018; Publication Date Nov. 22, 2016; DOI: 10.1109/TDSC.2016.2631548.

Halderman, J. Alex et. al; "Lest We Remember: Cold Boot Attacks on Encryption Keys;" Proceedings of the 17th USENIX Security Symposium; Jul. 28-Aug. 1, 2008; San Jose, California.

Khan, Mohammad Nasim Imtiaz et al.; "Analysis of Row Hammer Attack on STTRAM;" 2018 IEEE 36th International Conference on Computer Design (ICCD); Oct. 7-10, 2018; Orlando, Florida; DOI: 10.1109/ICCD.2018.00021.

Srivastava, Ankush et al.; "An Efficient Memory Zeroization Technique Under Side-Channel Attacks;" 2019 32nd International Conference on VLSI Design and 2019 18th International Conference on Embedded Systems (VLSID) Jan. 5-9, 2019; Delhi, NCR, India; DOI: 10.1109/VLSID.2019.00032.

Wenjing, Kang et al.; "Novel Security Strategies for SRAM in Powered-off State to Resist Physical Attack;" Proceedings of the 2009 12th International Symposium on Integrated Circuits; Dec. 14-16, 2009; Singapore.

Yitbarek, Salessawi Ferede et al.; "Cold Boot Attacks are Still Hot: Security Analysis of Memory Scramblers in Modern Processors;" 2017 IEEE International Symposium on High Performance Computer Architecture (HPCA) Feb. 4-8, 2017; Austin, Texas; DOI: 10.1109/HPCA.2017.10.

Zeitouni, Shaza et al.; "Remanence Decay Side-Channel: The PUF Case," IEEE Transactions on Information Forensics and Security; vol. 11, No. 6; Jun. 2016; Publication Date: Dec. 25, 2015; DOI: 10.1109/TIFS.2015.2512534.

* cited by examiner

DETECTION OF A COLD BOOT MEMORY ATTACK IN A DATA PROCESSING SYSTEM

BACKGROUND

Field

This disclosure relates generally to data processing, and more particularly, to detection of a cold boot memory attack in a data processing system.

Related Art

Some devices, like transit cards, credit cards, medical insurance cards, etc., use volatile memory such as dynamic random-access memory (DRAM) and static random-access memory (SRAM) to store sensitive data such as unencrypted private cryptographic keys. Software in the operating system of the device is typically provided for protecting the sensitive data. In a cold boot attack, an attacker attempts to gain control over the device by cooling the device down to a very low temperature, for example, to a temperature in a range of about −100 to 0 degrees Celsius and then switching the device off and on again very quickly. By cooling the device, the memory contents may still be in the same state as before power was removed. The attacker can then take over the booting process of the device. The operating system software that usually protects the data from being read out by unauthorized users may be rendered ineffective in the attack, thus allowing the attacker access to the sensitive data.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided, a method for detecting a cold boot attack and a data processing system implementing the method. The data processing system includes a processor, memory with error correction code (ECC), and a monitor circuit coupled to the processor and to the memory with ECC. When a booting process starts in a device having the data processing system, a boot start signal is sent to the monitor circuit. While the device is booting, the monitor circuit counts read and write accesses to the memory and maintains the read and write access counts. Also, in response to the boot start signal, the monitor circuit counts memory errors, as detected using ECC. A ratio of read accesses to write accesses is determined and a warning is provided if a predefined ratio is exceeded. Also, a warning is issued if a predefined ratio of ECC detected errors per read access is exceeded, which may be indicative of a high rate of flipped memory cell states in the memory, which can be an indication of an attack. In response to detecting an attack, countermeasures can be taken, such as shutting down the system or overwriting the memory.

More specifically, in one embodiment, a separate count may be maintained for correctable errors and uncorrectable errors. Using the read access count value, the correctable error count value and the uncorrectable error count value, the monitor circuit determines if an attack on a memory of the data processing system is in progress. In one embodiment a ratio of the detected total error count to the read access count is computed. If the ratio is greater than a threshold, it is determined that an attack is likely occurring, and an indication of the attack is provided. In another embodiment, a ratio of the correctable error count to read access count is computed and the ratio is compared to a threshold to detect a possible attack. Further, a ratio of the uncorrectable error count to read access count may be computed and the ratio is compared to another threshold. In each case, if the computed ratio is greater than the threshold, an attack is likely.

In many different types of systems, an attacker must provide an identity to access the device, where access to the device is necessary before an attack on the device can be made. By providing for the detection of a cold boot attack using, for example, the described method, an attacker may be identified, thus providing an opportunity to exclude the attacker from attacking not only the device he or she is currently attacking but also other devices.

In accordance with an embodiment, there is provided, a method for detecting a cold boot attack on a memory of a data processing system, the method including: detecting initiation of a booting process in the system; counting read accesses to the memory; running error correction code (ECC) on the memory in response to detecting the booting process; counting errors in the memory detected by the ECC during the booting process; and using the read access count and the detected error count, determining that an attack on the memory is likely to be occurring. Using the read access count and the detected error count may further include: determining a ratio of a detected error count to the read access count; wherein determining that an attack is occurring further comprises determining that the ratio is greater than a first threshold; and providing an indication of the likely cold boot attack. Counting errors in the memory detected by the ECC may further include: counting correctable errors in the memory; determining a ratio of a correctable error count to the read access count; and determining that the ratio of the read access count is greater than a third threshold. Counting errors in the memory by the ECC may further include: counting uncorrectable errors in the memory; determining a ratio of an uncorrectable error count to the read access count; and determining that the ratio of the read access count is greater than a third threshold. Counting errors in the memory detected by the ECC during the booting process may further include detecting correctable errors and detecting uncorrectable errors. The method may further include: counting write accesses to the memory during the boot process of the memory; determining a ratio of the read access count to the write access count; and determining that the ratio of the read access count to the write access count is greater than a second threshold. Determining a ratio of the detected error count to the read access count may further include: counting correctable errors of data read from the memory during the booting process; determining a ratio of the correctable error count to the read access count; counting uncorrectable errors of data read from the memory; and determining a ratio of the uncorrectable error count to the read access count. Providing an indication of the likely cold boot attack may further include determining that an attack on the memory has occurred when one or more of the ratio of the correctable error count to the read access count is greater than a second threshold, or the ratio of the uncorrectable error count to the read access count is greater than a third threshold. The memory may be a dynamic random-access memory. Detecting initiation of the booting process may further include sending a boot start signal to a monitoring circuit coupled to the memory and to an ECC circuit, in response, the monitoring circuit receiving the detected errors in the memory and providing the indication of the likely cold boot attack.

In another embodiment, there is provided, a method for detecting a cold boot attack on a memory, the method including: counting read and write accesses to the memory during a booting process of the memory; determining a ratio of the read access count to the write access count; counting correctable errors of data read from the memory during the booting process; determining a ratio of the correctable error count to the read access count; counting uncorrectable errors of data read from the memory; determining a ratio of the uncorrectable error count to the read access count; and determining that an attack on the memory has likely occurred when one of either the ratio of the read access count to the write access count is greater than a first threshold, the ratio of the correctable error count to the read access count is greater than a second threshold, or the ratio of the uncorrectable error count to the read access count is greater than a third threshold. The memory may be a dynamic random-access memory. The correctable errors may be one-bit or two-bit errors. Determining that the attack on the memory has likely occurred may further include providing an indication of the attack. The method may further include sending a boot start signal to a monitoring circuit coupled to the memory and to an ECC circuit, and in response, the monitoring circuit receiving the detected errors in the memory and providing the indication of the likely cold boot attack.

In yet another embodiment, there is provided, a data processing system including: a processor for executing instructions; a memory, coupled to the processor, for storing data for use by the processor in executing the instructions; an error correction code (ECC) block, coupled to the memory, for detecting errors in the stored data, and for correcting at least some of the detected errors in the stored data; and a monitor circuit coupled to the ECC block, and in response to receiving a boot start signal, the monitor circuit for counting read accesses and for counting errors in the memory detected by the ECC block, the monitor circuit providing an indication of a likely cold boot attack when a ratio of the error count to the read access count is greater than a first threshold. The memory may be a dynamic random-access memory. The data processing system may further include the monitor circuit for counting write accesses to the memory, wherein the monitor circuit providing an indication of a likely cold boot attack when a ratio of the read access count to the write access count exceeds a second threshold. The errors detected by the monitor circuit may further include correctable errors and uncorrectable errors, wherein the monitor circuit provides an indication of a likely cold boot attack when a ratio of the detected correctable errors to the read access count is greater than a third threshold, and wherein the monitor circuit provides an indication of a likely cold boot attack when a ratio of the detected uncorrectable errors to the read access count is greater than a fourth threshold. The data processing system may be implemented on at least one integrated circuit.

Figure 1:
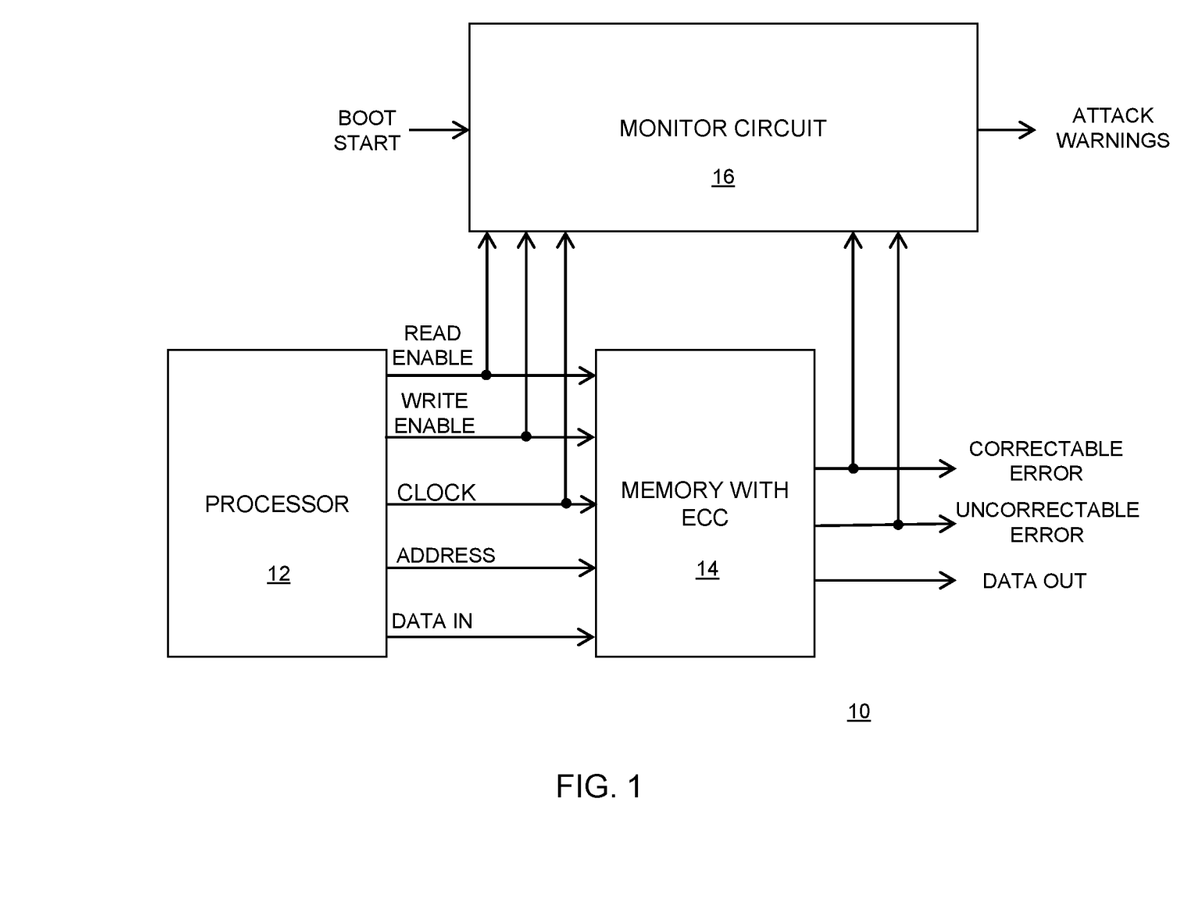
FIG. 1 illustrates a data processing system in accordance with an embodiment.

FIG. 1 illustrates data processing system 10 in accordance with an embodiment. Data processing system 10 includes processor 12, memory with ECC 14, and monitor circuit 16. The illustrated embodiment is greatly simplified, and an actual implementation will include additional circuitry and functionality not illustrated in FIG. 1. Data processing system 10 may be implemented on a single integrated circuit (IC) or on multiple ICs. Processor 12 may include one core or multiple cores and may be any hardware device capable of executing instructions. Processor 12 may execute instructions stored in memory with ECC 14, or some other memory (not shown) in data processing system 10. Also, processor 12 may be, for example, a microcontroller (MCU) microprocessor (MPU), field programmable gate array (FPGA), application-specific integrated circuit (ASIC), or similar device. In the illustrated embodiment, processor 12 includes outputs for providing control signals, address, and data to inputs of memory with ECC 14. For example, processor 12 has an output for providing a read enable (READ ENABLE) signal, an output for providing a write enable (WRITE ENABLE) signal, an output for providing a clock (CLOCK) signal, an output for providing an address (ADDRESS), and an output for providing input data (DATA IN) to the memory. The read enable signal is for initiating a read access to memory with ECC 14 and the write enable signal is for initiating a write access to memory with ECC 14.

Memory with ECC 14 includes outputs for providing output data, a correctable error (CORRECTABLE ERROR), an uncorrectable error (UNCORRECTABLE ERROR), and output data (DATA OUT). Memory 14 may include an array of volatile memory cells such as dynamic random-access memory (DRAM) cells or static random-access memory (SRAM) cells. Other random-access memory (RAM) types are also possible. The ECC implemented in memory and ECC 14 can be any type of ECC depending on the system requirements. In one embodiment, the ECC can correct one-bit and two-bit errors in the memory.

Monitor circuit 16 has an input for receiving a boot start (BOOT START) signal for indicating the initiation of a booting process. The boot starting signal can be generated by processor 12, or another circuit such as a watchdog circuit (not shown). An attacker may initiate a booting process. When an active boot start signal is received, monitor circuit 16 receives as inputs, the read enable (READ ENABLE), write enable (WRITE ENABLE), and clock (CLOCK) signals from processor 12, and maintains a count value of the read and write enable signals. In one embodiment, a single read access and a single write access each occupies a single clock cycle. Counting read accesses may be performed by counting clock cycles when the read enable (READ ENABLE) signal is active. Likewise, counting write accesses may be performed by counting clock cycles when the write enable (WRITE ENABLE) signal is active.

Figure 3:
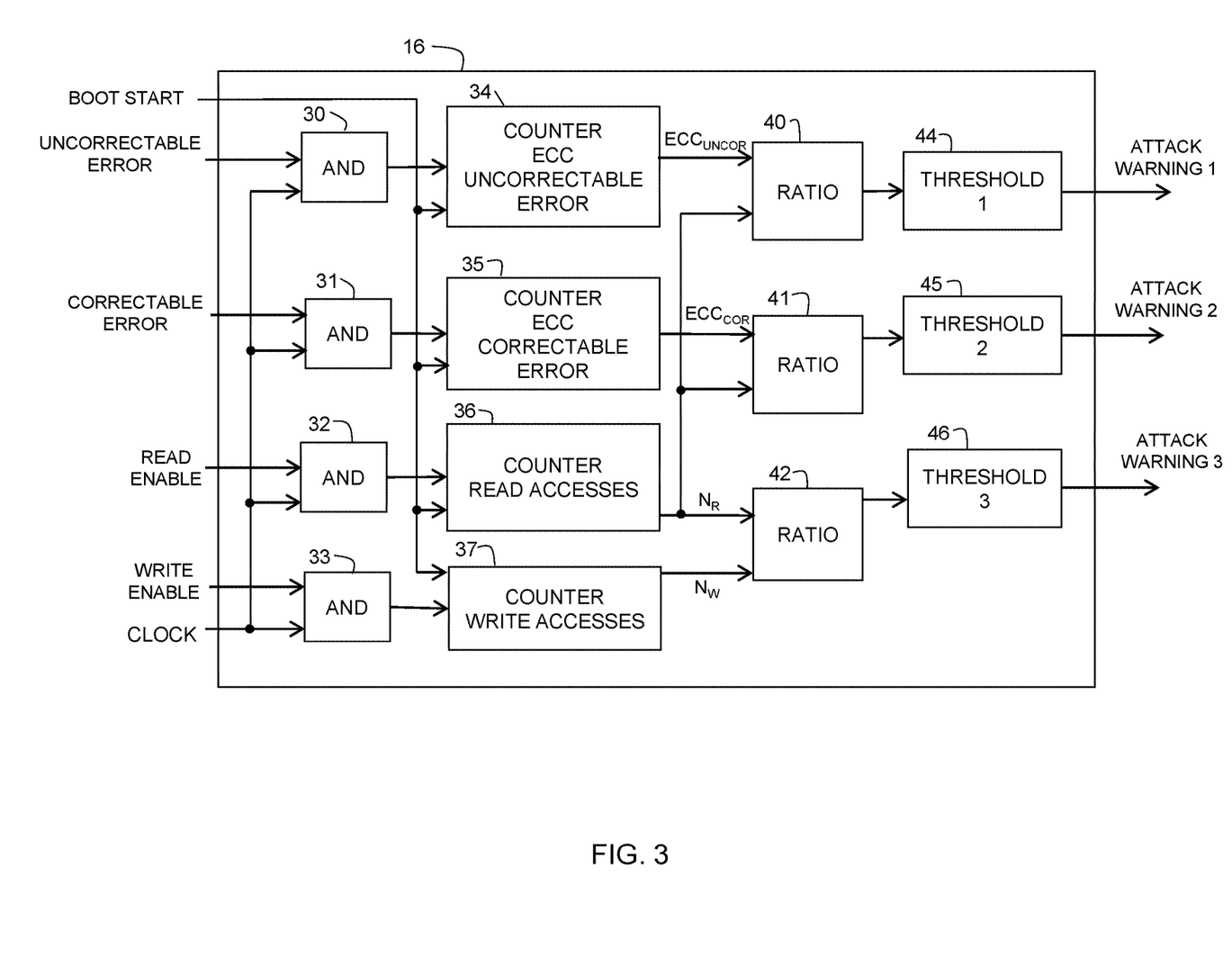
FIG. 3 illustrates an embodiment of the monitor circuit of the data processing system of FIG. 1 in more detail.

During a booting process of data processing system 10, most of the memory accesses should be write accesses to the memory. The write accesses would either over-write the data in the memory or copy data into the memory. Therefore, too many read accesses during the booting process may be an indication of an attack on the memory because the read accesses may be indicative of an attempt to read out data that was present in the memory before the booting process. Specifically, in one embodiment, a ratio of read accesses to write accesses is computed. If the ratio is above a predetermined threshold, an indication of a likely cold boot attack is provided. In addition, cold boot attacks can cause an increase in errors in the memory. Monitor circuit 16 receives an indication of correctable errors and uncorrectable errors from memory with ECC 14. Counters are provided to count correctable ECC errors and uncorrectable ECC errors as illustrated in FIG. 3. If a ratio of correctable errors to the read access count is above a predetermined threshold, a cold boot attack may be in progress. Also, a ratio of uncorrectable errors to the read access count may indicate a cold boot attack. Any one of the count values and ratio comparisons can be used as indication of a cold boot attack. When a likely cold boot attack is detected, an attack warning (ATTACK WARNINGS) is provided by monitor circuit 16.

Monitor circuit 16 detects cold boot attacks without interfering with the input data DATA IN and output DATA OUT from the memory. Monitor circuit 16 indicates when suspicious activity at the memory has been detected so that a hierarchically higher level can take appropriate action, e.g., shutdown the system or write data into the memory that is designed to mislead an attacker.

Figure 2:
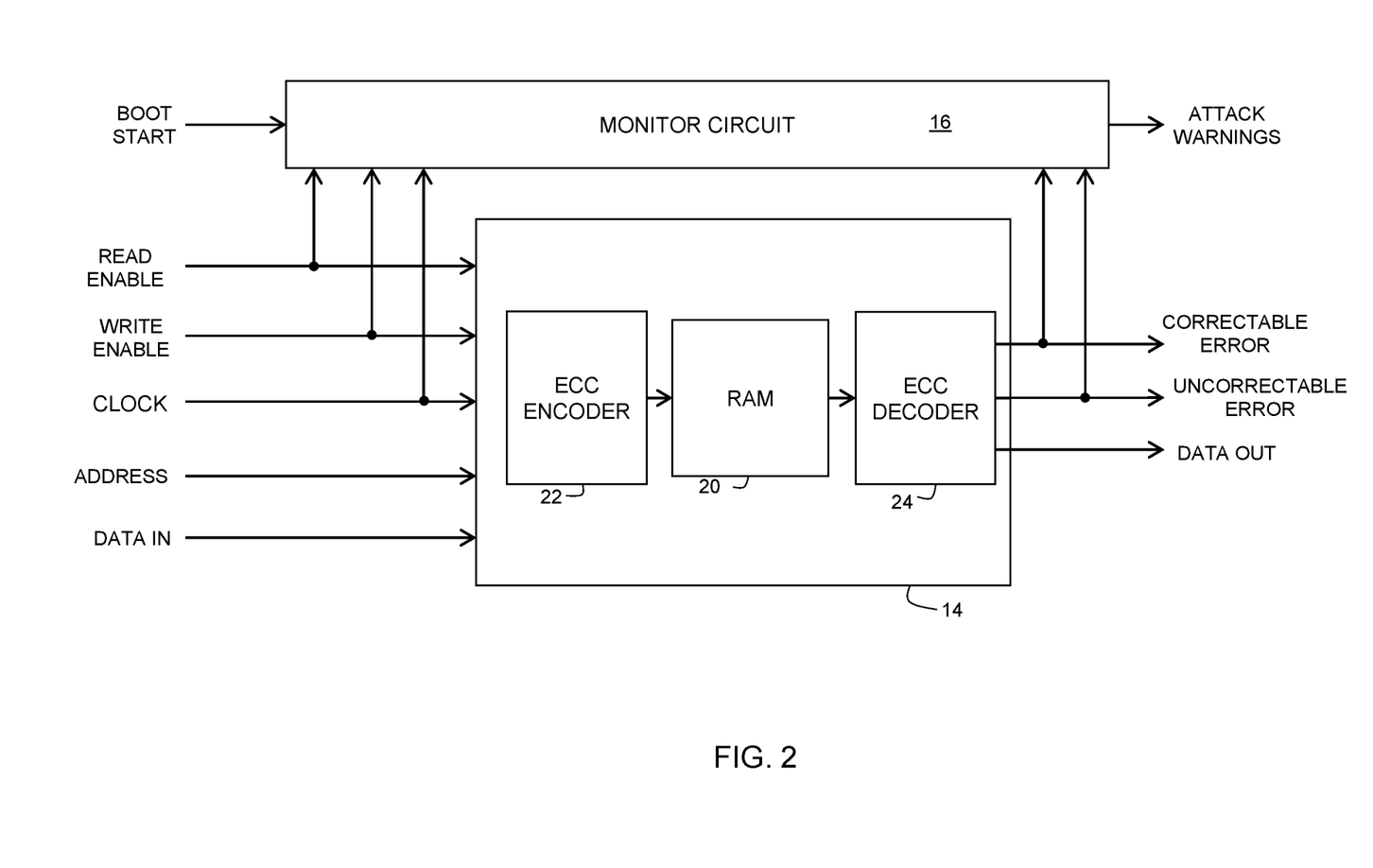
FIG. 2 illustrates an embodiment of the memory and error correction code (ECC) circuit of the data processing system of FIG. 1.

FIG. 2 illustrates an embodiment of the memory with ECC 14 of data processing system 10 of FIG. 1. Memory with ECC 14 includes RAM 20. Random-access memory 20 can be any type of RAM that is susceptible to cold boot attacks, such as a DRAM. The RAM can also be a multi-port or other type of RAM. In the illustrated embodiment, the ECC functionality includes a conventional ECC illustrated in FIG. 2 as an ECC ENCODER block 22 and ECC DECODER block 24. The ECC functionality can be any type of conventional ECC and will depend at least in part on the system requirements. For example, in a system with relatively low processing power, such as a transit card, the ECC functionality will be relatively simple. ECC ENCODER block 22 adds parity and/or other check bits to each word in memory. The memory used to store the parity and/or other check bits may be RAM 20 or a separate memory (not shown). ECC DECODER block 24 determines if there is an error in the parity or other check bits that were added to the word. During the booting process of the data processing system 10, the ECC runs and detects errors in the memory. Monitor circuit 16 records the number of read and write accesses to the memory and records the number of correctable and uncorrectable errors detected by the ECC. Most of the accesses to the memory should be write accesses. Also, after the booting process starts, a high number of ECC errors may indicate suspicious activity. The detected errors and the number of read and write accesses to the memory are used to detect a cold boot attack. One embodiment that uses the detected errors and read and write access counts is provided below in the discussion of FIG. 3.

FIG. 3 illustrates an embodiment of monitor circuit 16 of data processing system 10 of FIG. 1 in more detail. Monitor circuit 16 includes AND logic gates 30-33, counters 34-37, ratio functions 40-42, and threshold comparators 44-46. A clock signal from processor 12 is provided to an input of each of AND logic gates 30-33. AND logic gate 30 has an input for receiving an uncorrectable error (UNCORRECTABLE ERROR) signal from memory with ECC 14. AND logic gate 31 has an input for receiving a correctable error (CORRECTABLE ERROR) signal from memory with ECC 14. AND logic gate 32 has an input for receiving the read enable (READ ENABLE) signal. AND logic gate 33 has an input for receiving the write enable (WRITE ENABLE) signal. When the read enable signal and the clock signal are both logic high, a logic high output signal is provided to counter 36. Using the read enable signal, counter 36 maintains a count of read accesses to memory with ECC 14. When the write enable signal and the clock signal are both logic high, a logic high signal is provided by AND logic gate 33 to counter 37. Using the write enable signal, counter 37 maintains a count of write accesses to memory with ECC 14. The read access count value is provided to the ratio functions 40, 41, and 42. The write access count value is provided to ratio function 42. Ratio function 42 receives both the read and write access count values and determines a ratio of the read and write count values ($N_R/N_W$). After the booting process starts, most of the memory accesses should be write accesses. Threshold comparator 46 compares the $N_R/N_W$ ratio with a predetermined threshold value (THRESHOLD 3). If the ratio $N_R/N_W$ is greater than THRESHOLD 3, then a cold boot attack warning (ATTACK WARNING 3) is provided by monitor circuit 16. In one embodiment, the computation of $N_R/N_W$ is only performed when $N_W$ is rounded to a power of 2, e.g., $2^{10}$, $2^{12}$, $2^{16}$, etc. This simplifies the computation because $N_R$ can then be bit shifted by the respective exponent.

Each time an uncorrectable error is detected in memory by the ECC, the uncorrectable error (UNCORRECTABLE ERROR) signal is received at the input of AND logic gate 30. When the clock (CLOCK) signal and the uncorrectable error (UNCORRECTABLE ERROR) signal are both a logic high, a logic high output is provided by AND logic gate 30 to counter 34. Counter 34 maintains a count of the detected uncorrectable errors and provides the count ($ECC_{UNCORR}$) to ratio function 40. Ratio function 40 computes a ratio of the uncorrectable errors to read accesses ($ECC_{UNCORR}/N_R$) and provides the ratio $ECC_{UNCORR}/N_R$ to threshold comparator 44. Threshold comparator 44 compares the ratio $ECC_{UNCORR}/N_R$ to a predetermined threshold (THRESHOLD 1) and if the ratio $ECC_{UNCORR}/N_R$ is greater than THRESHOLD 1, a cold boot attack warning (ATTACK WARNING 1) is provided.

Each time a correctable error is detected in memory with ECC 14, the correctable error (CORRECTABLE ERROR) signal is received at the input of AND logic gate 31. When the clock (CLOCK) signal and the correctable error (CORRECTABLE ERROR) signal are both a logic high, a logic high output is provided by AND logic gate 31 to counter 35. Counter 35 maintains a count of the detected correctable errors and provides the count ($ECC_{CORR}$) to ratio function 41. Ratio function 41 computes a ratio of the correctable errors to read accesses ($ECC_{CORR}/N_R$) and provides the ratio $ECC_{CORR}/N_R$ to threshold comparator 45. Threshold comparator 45 compares the ratio $ECC_{CORR}/N_R$ to a predetermined threshold (THRESHOLD 2) and if the ratio $ECC_{CORR}/N_R$ is greater than THRESHOLD 2, a cold boot attack warning (ATTACK WARNING 2) is provided. Note that instead of AND logic gates, other embodiments may use a different logic gate or combination of logic gates. Also, the logic used may be determined in part by whether a signal is an active high signal or an active low signal.

Figure 4:
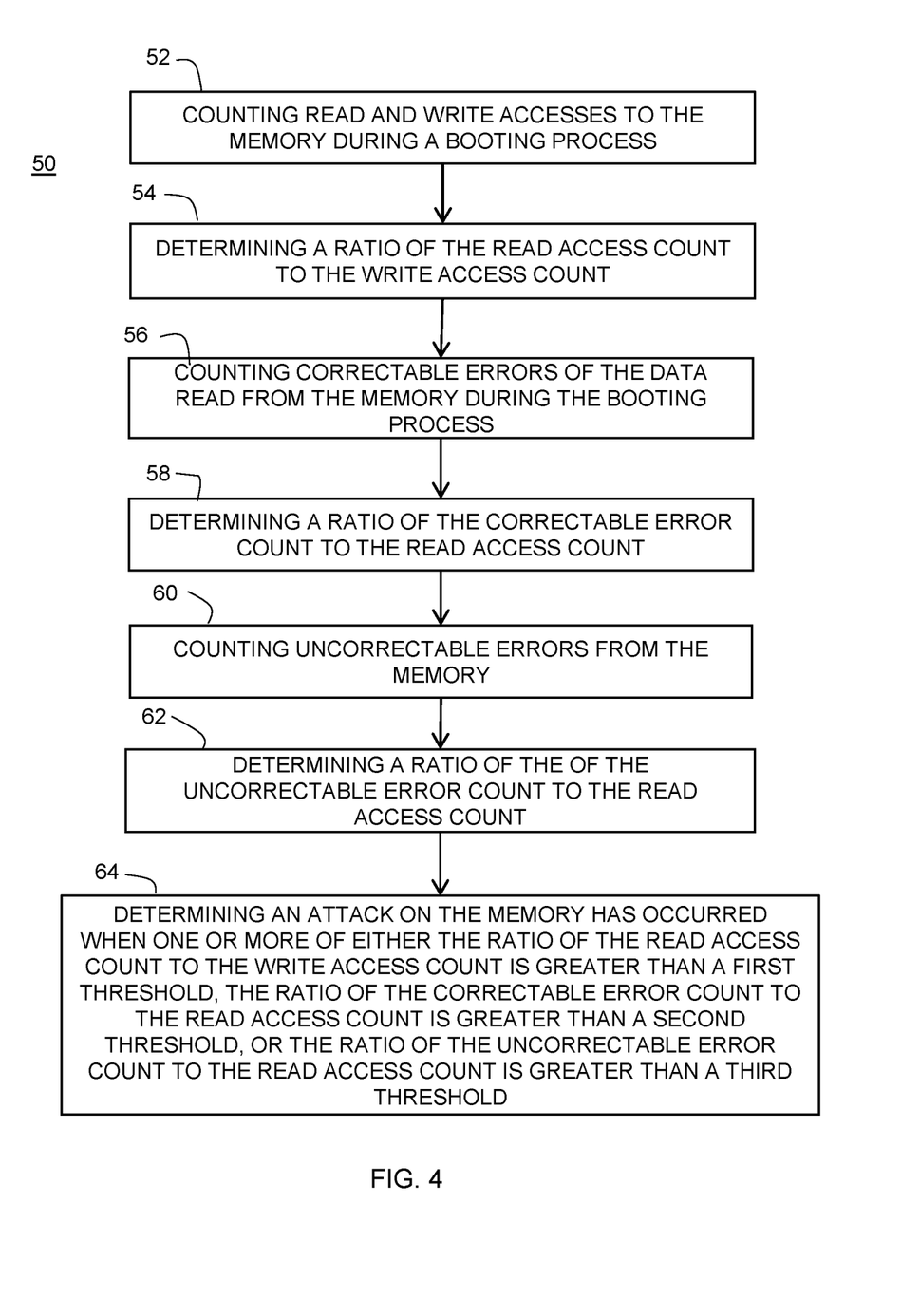
FIG. 4 is a flowchart of a method for detecting a cold boot attack on a memory in accordance with an embodiment.

FIG. 4 illustrates a flowchart of method 50 for detecting a cold boot attack on a memory with ECC in accordance with an embodiment. Method 50 begins at step 52. At step 52, read and write accesses to a memory are counted during a booting process of a data processing system having the memory. At step 54, a ratio of the detected read access count to the detected write access count is computed. At step 56, a count is made of correctable errors detected by the ECC associated with the memory. At step 58, a ratio of the correctable error count to the read access count is determined. At step 60, a count is made of uncorrectable errors detected by the ECC. At step 62, a ratio of the uncorrectable error count to the read access count is determined. At step 64, an attack on the memory may be indicated when one or more of either the ratio of the read access count to the write access count is greater than a first threshold, the ratio of the correctable error count to the read access count is greater than a second threshold, or the ratio of the uncorrectable error count to the read access count is greater than a third threshold.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for detecting a cold boot attack on a memory of a data processing system, the method comprising:
    detecting initiation of a booting process in the data processing system;
    counting read accesses to the memory during the booting process;
    running error correction code (ECC) on the memory in response to detecting the booting process;
    counting errors in the memory detected by the ECC during the booting process; and
    determining a ratio of a detected error count to the read access count;
    determining that an attack on the memory is occurring when the ratio of the detected error count to read access count is greater than a first threshold and providing an indication of the cold boot attack;
    counting write accesses to the memory during the boot process of the memory;
    determining a ratio of the read access count to the write access count;
    determining that an attack on the memory is occurring when the ratio of the read access count to the write access count is greater than a second threshold.

2. The method of claim 1, wherein counting errors in the memory detected by the ECC further comprises:
    counting correctable errors in the memory;
    determining a ratio of a correctable error count to the read access count; and
    determining that the ratio of the correctable error count to the read access count is greater than a third threshold.

3. The method of claim 1, wherein counting errors in the memory by the ECC further comprises:
    counting uncorrectable errors in the memory;
    determining a ratio of an uncorrectable error count to the read access count; and
    determining that the ratio of the ratio of the uncorrectable error count to the read access count is greater than a third threshold.

4. The method of claim 1, wherein counting errors in the memory detected by the ECC during the booting process further comprises detecting correctable errors and detecting uncorrectable errors.

5. The method of claim 1, wherein determining a ratio of the detected error count to the read access count further comprises:
    counting correctable errors of data read from the memory during the booting process;
    determining a ratio of the correctable error count to the read access count;
    counting uncorrectable errors of data read from the memory; and
    determining a ratio of the uncorrectable error count to the read access count.

6. The method of claim 1, wherein providing an indication of the cold boot attack further comprises determining that an attack on the memory has occurred when one or more of the ratio of the correctable error count to the read access count is greater than the second threshold, or the ratio of the uncorrectable error count to the read access count is greater than the third threshold.

7. The method of claim 1, wherein the memory is a dynamic random-access memory.

8. The method of claim 1, wherein detecting initiation of the booting process further comprises sending a boot start signal to a monitoring circuit coupled to the memory and to an ECC circuit, in response, the monitoring circuit receiving the detected errors in the memory and providing the indication of the cold boot attack.

9. A method for detecting a cold boot attack on a memory, the method comprising:
    counting read and write accesses to the memory during a booting process of the memory;
    determining a ratio of the read access count to the write access count;
    counting correctable errors of data read from the memory during the booting process;
    determining a ratio of the correctable error count to the read access count;
    counting uncorrectable errors of data read from the memory;
    determining a ratio of the uncorrectable error count to the read access count; and
    determining that an attack on the memory has occurred when one of either the ratio of the read access count to the write access count is greater than a first threshold, the ratio of the correctable error count to the read access count is greater than a second threshold, or the ratio of the uncorrectable error count to the read access count is greater than a third threshold.

10. The method of claim 9, wherein the memory is a dynamic random-access memory.

11. The method of claim 9, wherein the correctable errors are one-bit or two-bit errors.

12. The method of claim 9, wherein determining that the attack on the memory has occurred further comprises providing an indication of the attack.

13. The method of claim 9, further comprising sending a boot start signal to a monitoring circuit coupled to the memory and to an ECC circuit, and in response, the monitoring circuit receiving the detected errors in the memory and providing the indication of the cold boot attack.

14. A data processing system comprising:
   a processor for executing instructions;
   a memory, coupled to the processor, for storing data for use by the processor in executing the instructions;
   an error correction code (ECC) block, coupled to the memory, for detecting errors in the stored data, and for correcting at least some of the detected errors in the stored data; and
   a monitor circuit coupled to the ECC block, and in response to receiving a boot start signal, the monitor circuit for counting read accesses and for counting errors in the memory detected by the ECC block, the monitor circuit providing an indication of a cold boot attack when a ratio of the error count to the read access count is greater than a first threshold wherein the monitor circuit for counting write accesses to the memory, wherein the monitor circuit provides an indication of a cold boot attack when a ratio of the read access count to the write access count exceeds a second threshold.

15. The data processing system of claim 14, wherein the memory is a dynamic random-access memory.

16. The data processing system of claim 14, wherein the errors detected by the monitor circuit further comprise correctable errors and uncorrectable errors, wherein the monitor circuit provides an indication of a cold boot attack when a ratio of the detected correctable errors to the read access count is greater than a third threshold, and wherein the monitor circuit provides an indication of a cold boot attack when a ratio of the detected uncorrectable errors to the read access count is greater than a fourth threshold.

17. The data processing system of claim 14, wherein the data processing system is implemented on at least one integrated circuit.

* * * * *